US012135589B2

(12) United States Patent
Hsiang et al.

(10) Patent No.: US 12,135,589 B2
(45) Date of Patent: Nov. 5, 2024

(54) DOUBLE-AXIS SOFT HINGE MECHANISM AND FOLDABLE DEVICE HAVING SAME

(71) Applicant: Google LLC, Mountain View, CA (US)

(72) Inventors: Shih-Wei Hsiang, Taipei (TW); Hung-Wei Wang, Taipei (TW); Ching-Chih Yen, Taipei (TW); Po-Kai Lai, Taipei (TW); Jeng-wen Lin, Taipei (TW)

(73) Assignee: Google LLC, Mountain View, CA (US)

( * ) Notice: Subject to any disclaimer, the term of this patent is extended or adjusted under 35 U.S.C. 154(b) by 395 days.

(21) Appl. No.: 17/596,545

(22) PCT Filed: Dec. 7, 2020

(86) PCT No.: PCT/US2020/070873
§ 371 (c)(1),
(2) Date: Dec. 13, 2021

(87) PCT Pub. No.: WO2021/150360
PCT Pub. Date: Jul. 29, 2021

(65) Prior Publication Data
US 2022/0155828 A1     May 19, 2022

Related U.S. Application Data

(60) Provisional application No. 62/963,788, filed on Jan. 21, 2020.

(51) Int. Cl.
*G06F 1/16*     (2006.01)
*H04M 1/02*     (2006.01)

(52) U.S. Cl.
CPC .......... *G06F 1/1681* (2013.01); *G06F 1/1652* (2013.01); *H04M 1/0216* (2013.01); *H04M 1/0268* (2013.01)

(58) Field of Classification Search
CPC .... G06F 1/1681; G06F 1/1616; G06F 1/1652; H04M 1/0216; H04M 1/0268; H04M 1/0214; H04M 1/0243
See application file for complete search history.

(56) References Cited

U.S. PATENT DOCUMENTS 9,557,771 B2 *   1/2017  Park ...................... G06F 1/1681
10,423,019 B1    9/2019  Song
(Continued)

FOREIGN PATENT DOCUMENTS

CN    109841152 B   6/2019
CN    209358590 U   9/2019
(Continued)

OTHER PUBLICATIONS

International Search Report and Written Opinion for PCT Application No. PCT/US2020/070873, mailed on Mar. 30, 2021, 12 pages.
(Continued)

*Primary Examiner* — Keith Ferguson
(74) *Attorney, Agent, or Firm* — Shumaker & Sieffert, P.A.

(57) ABSTRACT

A foldable device may include a foldable layer and a hinge mechanism. The hinge mechanism may include at least one synchronizing module, at least one torsion module, and a cover module. The at least one synchronizing module may include a synchronizing gear assembly including a first linking gear in meshed engagement with a first rotating link, a second linking gear in meshed engagement with a second rotating link, and at least one intermediate gear in meshed engagement with the first linking gear and the second linking gear. The first rotating link may be coupled to a first housing of a computing device and the second rotating link may be coupled to a second housing of the computing device. The meshed engagement of the first and second rotating links may provide of synchronized, symmetric (Continued)

movement of the first and second housings about a central axis of the computing device.

18 Claims, 12 Drawing Sheets

(56) References Cited

U.S. PATENT DOCUMENTS

2015/0153787 A1   6/2015  Mok et al.
2018/0136696 A1   5/2018  Chen et al.

FOREIGN PATENT DOCUMENTS

EP          3489795 A1    5/2019
WO    WO-2005101963 A2 *  11/2005  ............ H04M 1/022

OTHER PUBLICATIONS

Communication pursuant to Article 94(3) EPC from counterpart European Application No. 20834108.1 dated May 30, 2023, 6 pp.
First Office Action and Search Report, and translation thereof, from counterpart Chinese Application No. 202080065266.8 dated Sep. 14, 2023, 14 pp.
International Preliminary Report on Patentability from International Application No. PCT/US2020/070873 dated Jul. 26, 2022, 9 pp.
Response to Communication Pursuant to Rules 161(1) and 162 EPC dated Apr. 12, 2022, from counterpart European Application No. 20834108.1, filed Aug. 23, 2022, 35 pp.

* cited by examiner

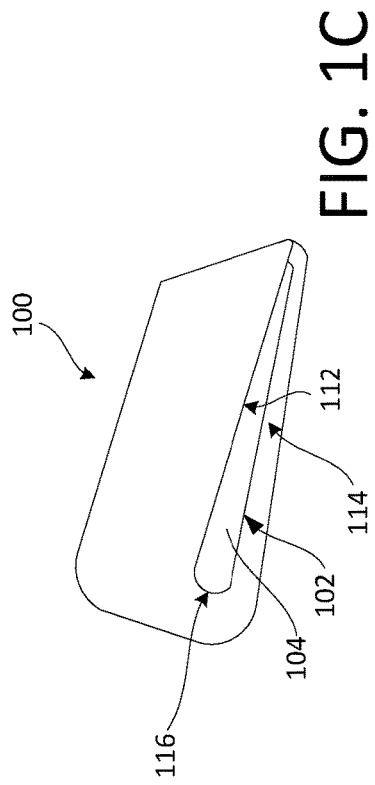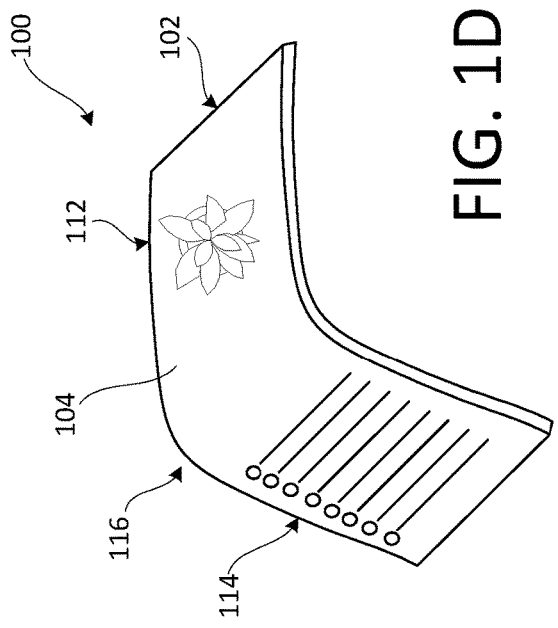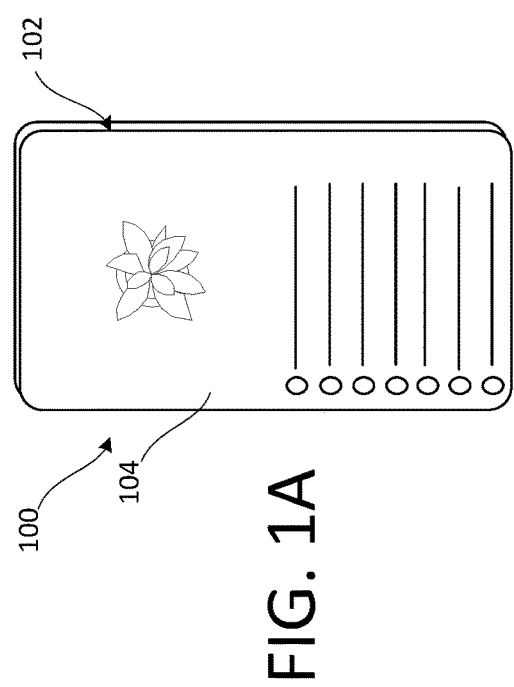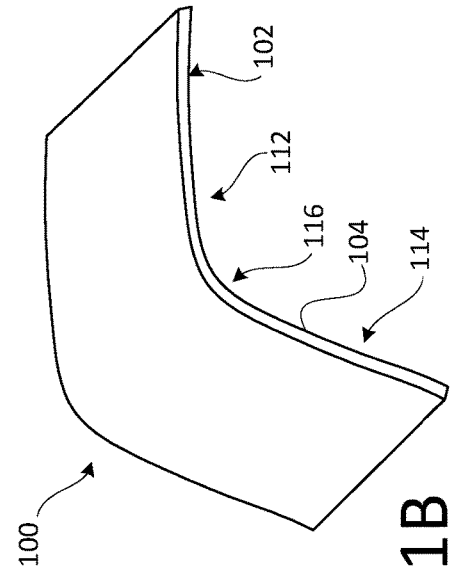

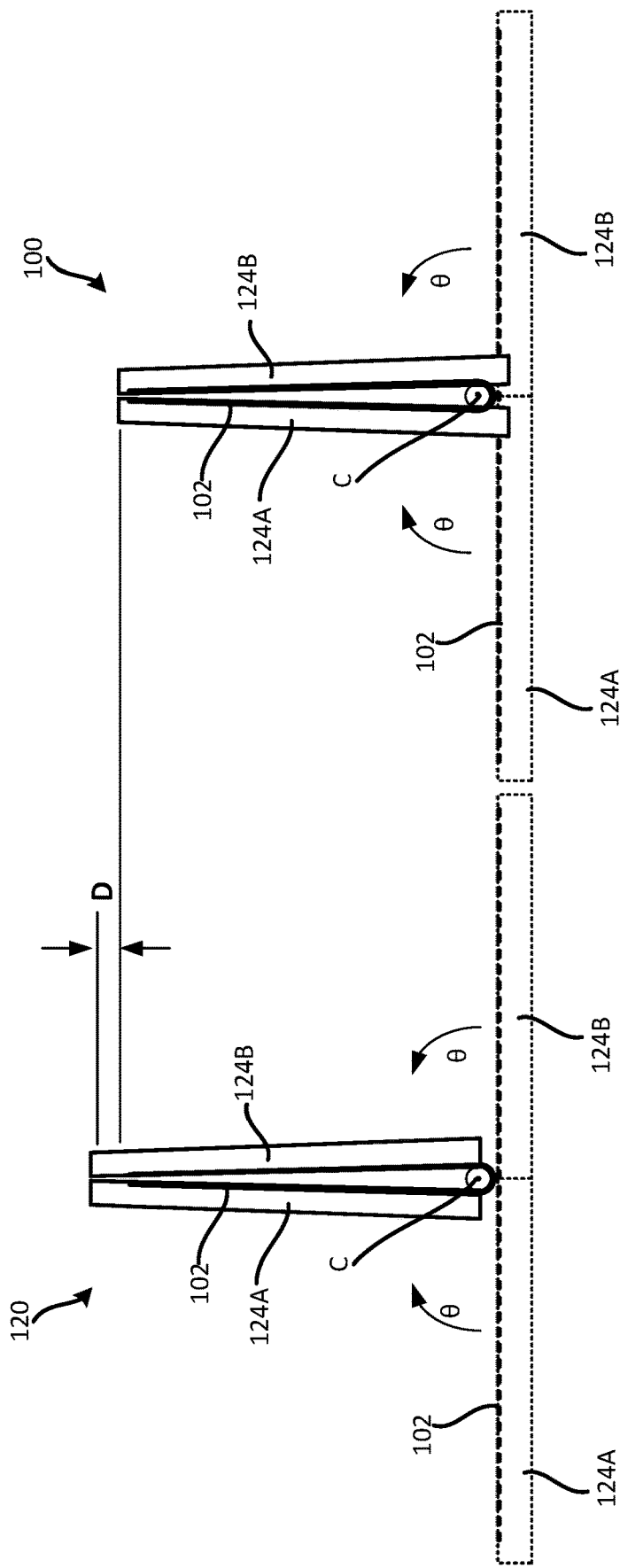

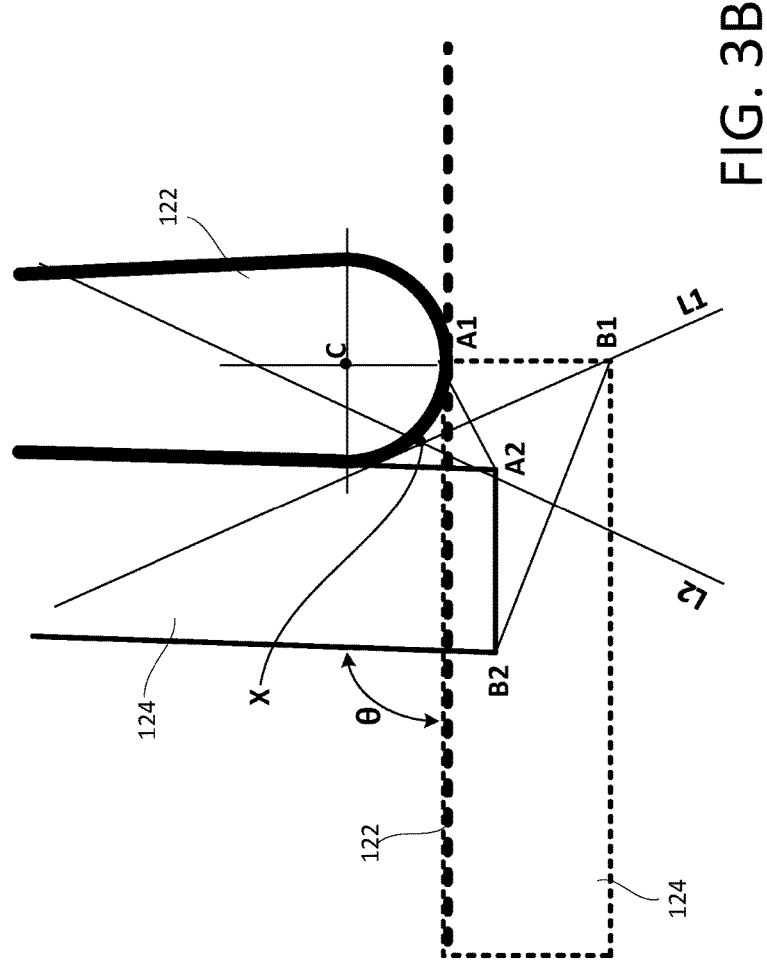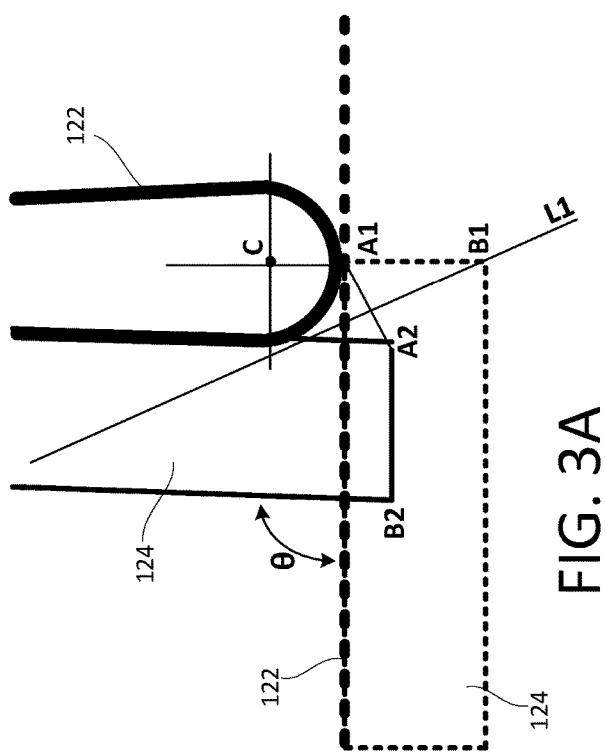

DOUBLE-AXIS SOFT HINGE MECHANISM AND FOLDABLE DEVICE HAVING SAME

CROSS REFERENCE TO RELATED APPLICATIONS

This application is a 35 U.S.C. § 371 National Phase Application from PCT/US2020/070873, filed on Dec. 7, 2020, entitled "DOUBLE-AXIS SOFT HINGE MECHANISM AND FOLDABLE DEVICE HAVING SAME", which claims priority to U.S. Provisional Application No. 62/963,788, filed on Jan. 21, 2020, the disclosures of which are incorporated by reference herein in their entirety.

TECHNICAL FIELD

This description relates, in general, to hinge mechanisms for foldable devices, and, in particular, to hinge mechanisms supporting foldable display systems.

BACKGROUND

Modern computing devices often attempt to achieve a balance between portability and functionality. The desire for a device that provides for a rich display of information on a single surface (suggesting a device having a relatively large form factor) may conflict with the desire to have a device that is small enough to be easily carried and easily accessible (suggesting a device having a relatively small form factor). A flexible, or foldable, display device may enhance the capabilities of a computing device, in that, in a folded configuration, the device may have a relatively small form factor, and in an unfolded configuration, the device may take advantage of a relatively large display area. In some situations, mechanisms guiding and supporting the folding and unfolding of such a device may be relatively complex, and susceptible to failure. These complex mechanisms may produce a somewhat artificial folding motion, and may introduce stress on the foldable device, thus damaging components of the display portion of the foldable device. Flexible support in a bending area of the display portion of the foldable device may provide a more natural folding motion, may maintain a desired contour, or curvature, of the display portion in the folded configuration, and a desired flatness in the unfolded configuration, and may prevent damage due to excessive compression and/or tension exerted on components of the display portion.

SUMMARY

In a general aspect, a hinge mechanism may include a synchronizing module, a torsion module, and a cover module. The synchronizing module may include a first rotating link, a second rotating link, and a synchronizing gear assembly positioned between the first rotating link and the second rotating link, and in meshed engagement with the first rotating link and the second rotating link. The torsion module may be coupled to the synchronizing module so as to selectively exert a biasing force on the synchronizing module based on a position of the first and second rotating links with respect to the synchronizing gear assembly. The cover module may be coupled to the synchronizing module, for coordinated movement of the cover module with the synchronizing module.

In another general aspect, a hinge mechanism may include a synchronizing module, a torsion module, and a cover module. The synchronizing module may include a first rotating link, a second rotating link, and a synchronizing gear assembly rotatably coupled to the first rotating link and the second rotating link through meshed engagement with the first rotating link and the second rotating link. The torsion module may be coupled to the synchronizing module. The torsion module may be configured to selectively exert a biasing force on the synchronizing module. The cover module may be coupled to the synchronizing module. The cover module may be configured to move in response to movement of the synchronizing module.

Implementations of either of the general aspects described above can include one or more of the following features, in isolation, or in any combination with each other. For example, in some implementations, the synchronizing gear assembly may be positioned between the first rotating link and the second rotating link. In some implementations, the torsion module may be configured to selectively exert a biasing force on the synchronizing module based on a position of the first and second rotating links with respect to the synchronizing gear assembly.

In some implementations, the first and second rotating links may each include a body, a rotating arm at a first end portion of the body, the rotating arm being configured to be coupled to a corresponding portion of a housing of a computing device, and an internal gear at a second end portion of the body, wherein the internal gear is configured to be in meshed engagement with a corresponding linking gear of the synchronizing gear assembly. In some implementations, the synchronizing gear assembly may include a first gear plate, a first linking gear in meshed engagement with the internal gear of the first rotating link, a second gear plate, a second linking gear in meshed engagement with the internal gear of the second rotating link, a first intermediate gear positioned between the first and second gear plates, and in meshed engagement with the first linking gear, and a second intermediate gear positioned between the first and second gear plates, and in meshed engagement with the first intermediate gear and with the second linking gear.

In some implementations, the first linking gear extends through the first gear plate, with a first portion of the first linking gear positioned at a first side of the first gear plate, the first portion of the first linking gear being in meshed engagement with the internal gear of the first rotating link, and a second portion of the first linking gear positioned at a second side of the first gear plate being in meshed engagement with the first intermediate gear. In some implementations, the second linking gear extends through the second gear plate, with a first portion of the second linking gear positioned at a first side of the second gear plate, the first portion of the second linking gear being in meshed engagement with the internal gear of the second rotating link, and a second portion of the second linking gear positioned at a second side of the second gear plate being in meshed engagement with the second intermediate gear.

In some implementations, the torque module may include a torque bracket, a first torque beam and a second torque beam coupled to the torque bracket, a first biasing device coupled to the torque bracket and to the first torque beam, a second biasing device coupled to the torque bracket and to the second torque beam, a first sliding bracket slidably coupled to the first torque beam, and a second sliding bracket slidably coupled to the first torque beam. In some implementations, the first sliding bracket may be configured to be coupled to a first portion of a housing of a computing device. In some implementations, the second sliding bracket may be configured to be coupled to a first portion of a housing of a computing device.

In some implementations, the first torque beam and the second torque beam may each include a body, a coupling portion defined at a first end portion of the body, a first slot arm extending outward from the coupling portion, and a second slot arm extending outward from the coupling portion, arranged in parallel to the first slot arm, and spaced apart from the first slot arm.

In some implementations, the first biasing device and the second biasing device may each include a pin extending through a corresponding opening in the torque bracket and into the coupling portion of the respective torque beam, and a spring positioned on a shaft of the pin, between a head of the pin and the torque bracket.

In some implementations, the first sliding device and the second sliding device may each include a sliding bracket having a tab positioned between the first slot arm and the second slot arm of the respective torque beam, a sliding pin extending through a slot in the first slot arm, through the tab of the sliding bracket, through a slot in the second slot arm, and into a body portion of the sliding bracket, wherein the sliding pin is slidable along a length of the slot in the first slot arm and along a length of the slot in the second slot arm. In some implementations, the first sliding device and the second sliding device may each further include a sliding plate having a pin that is received in an opening in the coupling portion of the respective torque beam, wherein the sliding plate is configured to be coupled to a corresponding portion of a housing of a device in which the hinge mechanism is installed. In some implementations, in a folded configuration of the hinge mechanism, the sliding pin abuts a first end of the slot in the first slot arm and a first end of the slot in the second slot arm, so as to limit further rotation of the hinge mechanism in a first direction, and in an unfolded configuration of the hinge mechanism, the sliding pin abuts a second end of the slot in the first slot arm and a second end of the slot in the second slot arm, so as to limit further rotation of the hinge mechanism in a second direction.

In some implementations, the cover module may include a central segment, a first lateral segment movably coupled at a first lateral side of the central segment, and a second lateral segment movably coupled at a second lateral side of the central segment. The cover module may be configured to movably extend between a first housing and a second housing of a computing device in response to relative movement between the first housing and the second housing. In some implementations, the central segment may include a protrusion along a central longitudinal portion thereof. In an unfolded configuration of the hinge mechanism, an end portion of the first lateral segment may abuts a first side of the protrusion, and an end portion of the second lateral segment may abut a second side of the protrusion, so as to restrict further rotation of the cover module.

In some implementations, the first rotating link may be configured to be fixed to the first housing, the second rotating link may be configured to be fixed to the second housing, and a first bracket and a second bracket of the synchronizing module may be fixed to the central segment of the cover module.

According to a further general aspect, there is provided a foldable device including a housing, a foldable display coupled to the housing, and a hinge mechanism received in the housing, at a position corresponding to a bendable section of the foldable display. The hinge mechanism may be according to either of the above described aspects, and may include one or more of the features described above, in isolation, or in any combination with each other. The hinge mechanism may also include one or more of the following features, in isolation, or in any combination with each other. For example, in some implementations, the first rotating link may be coupled to a first portion of the housing, the second rotating link may be coupled to a second portion of the housing, and the cover module may be coupled to the first and second portions of the housing, for coordinated movement of the cover module, the synchronizing module, and the first and second portions of the housing.

In some implementations, the rotating arms at the first end portions of the first and second rotating links are each coupled to the respective portion of the housing. In some implementations, the first sliding device of the torque module is fixedly coupled to the first portion of the housing, and the second sliding device of the torque module is fixedly coupled to the second portion of the housing. In some implementations, the first lateral segment of the cover module is fixedly coupled to the first portion of the housing, and the second lateral segment of the cover module is fixedly coupled to the second portion of the housing.

In some implementations, the foldable device may comprise a plurality of hinge mechanisms.

In a further general aspect, there is provided a foldable device including a foldable layer and a hinge mechanism. The hinge mechanism may include at least one synchronizing module, at least one torsion module, and a cover module. The at least one synchronizing module may include a synchronizing gear assembly including a first linking gear in meshed engagement with a first rotating link, a second linking gear in meshed engagement with a second rotating link, and at least one intermediate gear in meshed engagement with the first linking gear and the second linking gear. The first rotating link may be coupled to a first housing of a computing device and the second rotating link may be coupled to a second housing of the computing device. The meshed engagement of the first and second rotating links may provide of synchronized, symmetric movement of the first and second housings about a central axis of the computing device.

It will be appreciated that features described in the context of, or in combination with, one aspect or implementation of the present disclosure may be used in combination with other aspects or implementations described herein.

At least some of the above features that accord with the invention, and other features according to the invention, are set out in the claims.

BRIEF DESCRIPTION OF THE DRAWINGS

FIGS. 1A-1D illustrate an exemplary computing device including an exemplary foldable display.

FIGS. 2A through 3B are schematic diagrams of the determination of a fixed center of rotation of a device body, in accordance with implementations described herein.

DETAILED DESCRIPTION

Figure 4A:
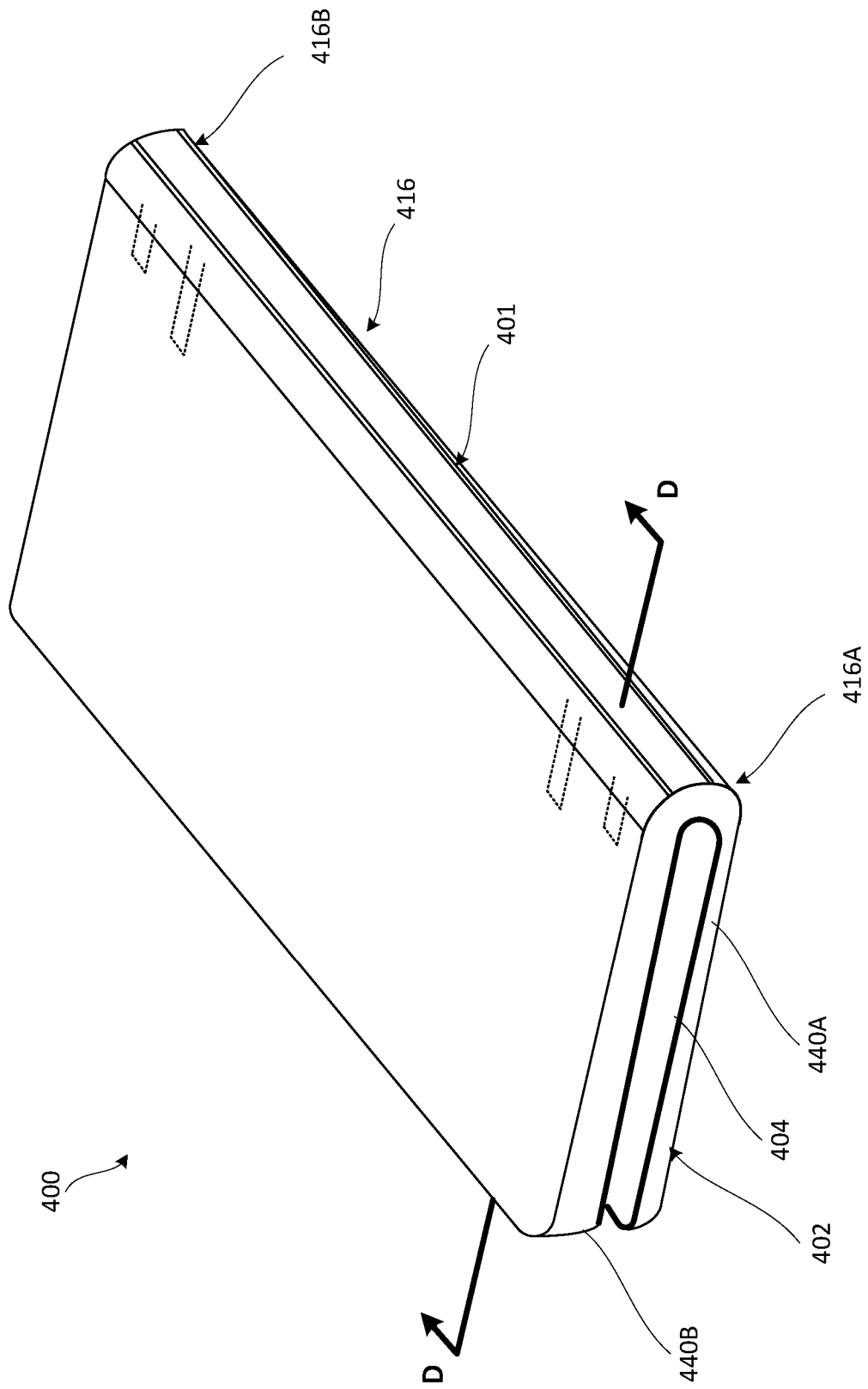
FIGS. 4A and 4B are perspective views of an exemplary computing device including an exemplary hinge mechanism, in a folded configuration and in an unfolded configuration, respectively, in accordance with implementations described herein.

A computing device including a hinge mechanism, in accordance with implementations described herein, may provide a relatively simple, and a relatively reliable, mechanism to support and guide the folding and the unfolding of a foldable display of the computing device. In some implementations, the hinge mechanism may maintain the foldable display within allowable bending radius limits, both in the folded configuration and in the unfolded configuration, of the computing device. In some implementations, the hinge mechanism may allow for a reduced stacking thickness in the folded configuration, while maintaining the foldable display within allowable bending radius limits. The relatively simple and reliable hinge mechanism, in accordance with implementations described herein, may guide and support the natural folding and unfolding of the computing device including the foldable display, while still providing support to the foldable display, and while still maintaining the foldable display within allowable bending radius limits.

FIGS. 1A-1D illustrate an exemplary computing device 100 that includes a foldable layer 102. In particular, FIG. 1A is a front view of the exemplary computing device 100 in an unfolded configuration. FIG. 1B is a perspective view of the exemplary computing device 100 in a partially folded configuration. FIG. 1C is a side view of the exemplary computing device 100 in a fully folded configuration. FIG. 1D is a perspective view of the exemplary computing device 100 in a partially folded configuration. In the exemplary computing device 100 shown in FIGS. 1B and 1C, the foldable layer 102 is a foldable display 102 that is mounted so that a display surface 104 faces inward in the folded configuration. In the exemplary computing device 100 shown in FIG. 1D, the foldable layer 102 is a foldable display 102 that is mounted so that a display surface 104 faces outward in the folded configuration. The foldable display 102 can include a flexible organic light emitting diode (OLED) layer.

In some implementations, the foldable display 102 can include a first relatively flat, relatively rigid, or-semi-rigid, section 112, a second relatively flat, relatively rigid, or semi-rigid, section 114, and a foldable portion or bendable section 116. In some implementations, the foldable display 102 can include more than two flat, rigid sections 112, 114 and/or more than one bendable section 116. In some implementations, the foldable display 102 can include zero, or only one, flat rigid section 112, 114. For example, when a foldable display 102 includes zero flat rigid sections, the foldable display 102 may be substantially continuously bendable, and may be rolled up, as in a scroll. The exemplary foldable display 102 shown in FIGS. 1A-1D includes an exemplary bendable section 116 that allows the foldable display 102 to bend about an axis. In some implementations, the foldable display 102 can include more than one bendable section that allows the flexible display 102 to bend about more than one axis.

In the exemplary computing device 100 shown in FIGS. 1A-1D, the bendable section 116 may allow the foldable display 102 to bend, or fold, for example, in an arcuate shape, that has a bending radius, and/or a radius of curvature. In some implementations, a hinge mechanism, in accordance with implementations described herein, may support and guide a folding and an unfolding of the foldable display 102 at the bendable section 116. In some implementations, the hinge mechanism, in accordance with implementations described herein, may be installed in the computing device 100, at a position corresponding to the bendable section 116 of the foldable display 102. In some implementations, the hinge mechanism may limit or restrict folding or bending of the foldable display 102 to within allowable bending parameters, to prevent damage to fragile components of the foldable display 102. For example, in the folded configuration shown in FIG. 1C, the hinge mechanism may prevent the foldable display 102 from bending beyond a minimum bending radius (e.g., less than 10 millimeters, less than 5 millimeters, or less than 2 millimeters). In the unfolded configuration shown in FIG. 1A, the hinge mechanism may prevent the foldable display from bending beyond a maximum bending radius.

A computing device including a hinge mechanism, in accordance with implementations described herein, may support and guide a folding and an unfolding of a foldable display of the computing device, while also maintaining the foldable display within allowable bending limits. The hinge mechanism, in accordance with implementations described herein, may provide for relatively smooth, natural-feeling folding and unfolding of the computing device including the foldable display. In developing a hinge mechanism to accomplish this, particularly without the use of complex gearing and/or sliding mechanisms, a center of rotation of the foldable display, a minimum bending radius of the foldable display, and other such factors may be taken into consideration.

For example, FIGS. 2A and 2B illustrate an exemplary computing device 120 including a foldable display 122 coupled to a first body 124A and a second body 124B of the computing device 120. To move from the unfolded configuration (shown in dotted lines) to the folded configuration (shown in solid lines), the foldable display 122 is rotated about a center of rotation C of the foldable display 122. However, in moving from the unfolded configuration to the folded configuration, the center of rotation of the first body 124A and the center of rotation of the second body 124B are not the same as the center of rotation C of the foldable display 122, causing movement, for example, sliding movement of the first and second bodies 124A, 124B in order to accommodate the folding and unfolding of the foldable display 122, as shown in FIG. 2A. This results in a stroke distance D, compared to an arrangement in which the first and second bodies 124A, 124B are in some way fixed or adhered to corresponding portions of the foldable display 122, as shown in FIG. 2B. To accommodate this stroke distance D, a center of rotation of the first and second bodies 124A, 124B of the computing device 120 may be determined. A hinge mechanism, in accordance with implementations described herein, may allow the first and second bodies 124A, 124B to rotate about their respective centers of rotation, while the foldable display 122 rotates about its center of rotation C. Determination of the individual center(s) of rotation to accommodate the folding and unfolding of the foldable display 122, to account for this difference, will be described in more detail with respect to FIGS. 3A and 3B.

FIGS. 3A and 3B illustrate the rotation of the exemplary computing device 120 shown in FIGS. 2A and 2B, from an initial position (an unfolded configuration, shown in dotted lines) to a final position (a folded configuration, shown in solid lines). FIGS. 3A and 3B illustrate only the movement of one of the first/second bodies 124A/124B of the computing device 120, from the initial (unfolded) position to the final (folded) position, simply for ease of discussion and illustration. The principles to be described apply to the determination of the center of rotation of each of the first body 124A and the second body 124B in a similar manner. Thus, the description of FIGS. 3A and 3B will simply reference a device body.

As shown in FIGS. 3A and 3B, reference points Ai and Bi (where "i" is equal to 1 or 2, as used in FIGS. 3A and 3B) may be designated on the device body 124. In the example shown in FIG. 3A reference points Ai and Bi are designated at upper and lower end portions of an end portion of the device body 124 at which the device body 124 rotates, or pivots. In rotating the device body 124 from the initial position, through the angle θ, to the final position, the first reference point moves from an initial position A1 to a final position A2. Similarly, the second reference point moves from an initial position B1 to a final position B2. A line A1-A2 may be drawn connecting the points A1 and A2, and then a first line L1, bisecting (i.e., orthogonally bisecting) the line A1-A2, may be drawn, as shown in FIG. 3A. A line B1-B2 may be drawn connecting the points B1 and B2, and then a second line L2, bisecting (i.e., orthogonally bisecting) the line B1-B2, may be drawn, as shown in FIG. 3B. The point X, at which the first line L1 and the second line L2 intersect, may define the center of rotation X of the device body 124. As noted above, the process described above with respect to FIGS. 3A and 3B may be applied similarly to the first body 124A to determine a center of rotation of the first body 124A, and to the second body 124B to determine a center of rotation of the second body 124B (that is different from the center of rotation of the first body 124A). In this example, the exemplary reference points A and B are positioned at corners of the device body 124, simply for ease of discussion and illustration. However, in some implementations, other reference points may be selected at the rotational end portion of the device body 124, and the process described above may be used to determine the center of rotation X of the device body 124.

Figure 4B:
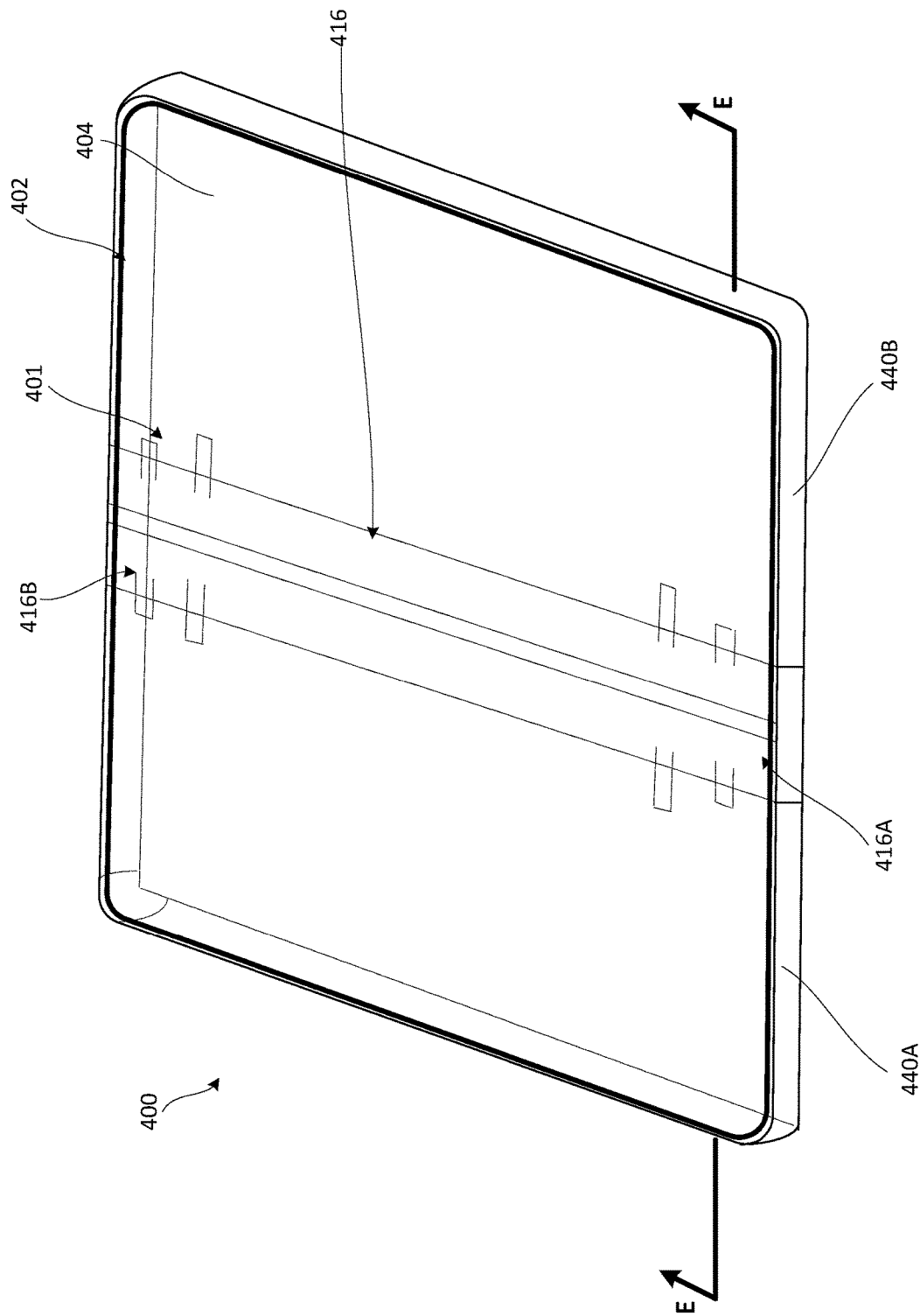

FIGS. 4A and 4B are perspective views of an exemplary computing device 400 including a foldable layer 402, such as, for example, a foldable display 402, supported by an exemplary hinge mechanism 401, in accordance with implementations described herein. The exemplary hinge mechanism 401 may be received in a housing 440 of the computing device 400, and positioned within the housing 440 at a position corresponding to a foldable portion 416, or bendable section 416 of the foldable display 402, for example, between a first housing 440A and a second housing 440B of the computing device 400. In FIG. 4A, the exemplary computing device 400 is in the folded configuration. In FIG. 4B, the exemplary computing device 400 is in the unfolded configuration. In the exemplary computing device 400 shown in FIGS. 4A and 4B, the foldable display 402 is mounted on the computing device 400 so that a display surface 404 of the foldable display 402 faces inward when the device 400 is in the folded configuration. However, in some implementations, the foldable display 402 may be mounted so that the display surface 404 faces outward when the device 400 is in the folded configuration (not shown).

In the exemplary computing device 400 shown in FIGS. 4A and 4B, the bendable section 416 of the foldable display 402 is at a central portion of the computing device 400, simply for purposes of discussion and illustration. In some implementations, the bendable section 416 may be located at positions other than the central portion of the computing device 400, and/or the foldable display 402 can include more bendable sections. In some implementations, the foldable display 402 can be substantially continuously bendable. In the exemplary foldable display 402 shown in FIGS. 4A and 4B, the bendable section 416 allows the foldable display 402 to bend about an axis.

The hinge mechanism 401, in accordance with implementations described herein, may be located in the computing device 400, at a position corresponding to the bendable section 416 of the foldable display 402. The hinge mechanism 401 may support and guide the folding and the unfolding of the foldable display 402. That is, the hinge mechanism 401 may provide for a relatively natural folding and unfolding motion between the folded configuration shown in FIG. 4A and the unfolded configuration shown in FIG. 4B. In some implementations, the hinge mechanism 401 may limit, or restrict, an amount of bending or folding in the folded configuration, to prevent the foldable display 402 from bending beyond a minimum bending radius of the foldable display 402, and/or from bending beyond a maximum bending radius of the foldable display 402, which may result in damage to fragile components of the foldable display 402.

Figure 5A:
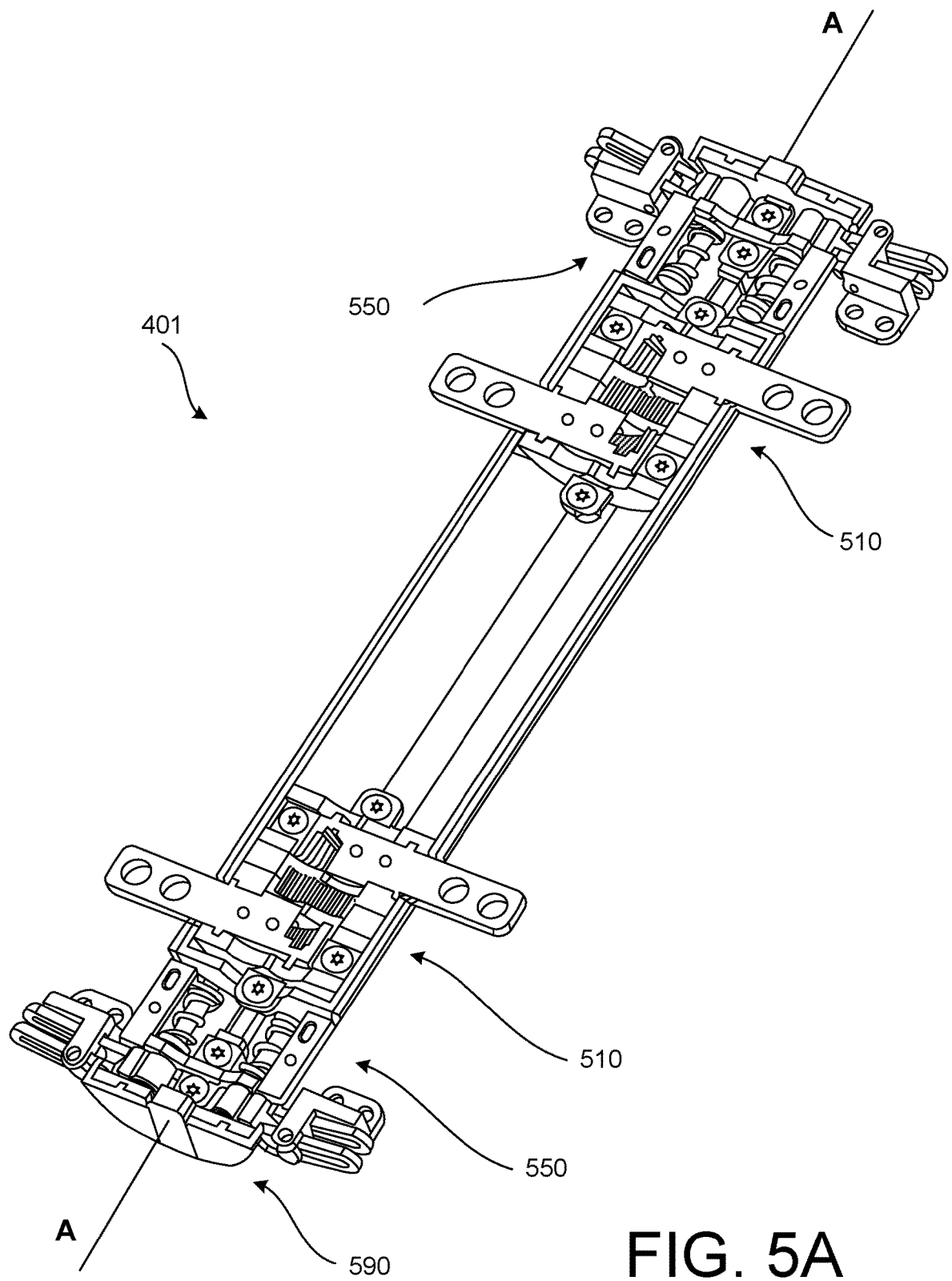
FIG. 5A is an assembled perspective view.
Figure 5B:
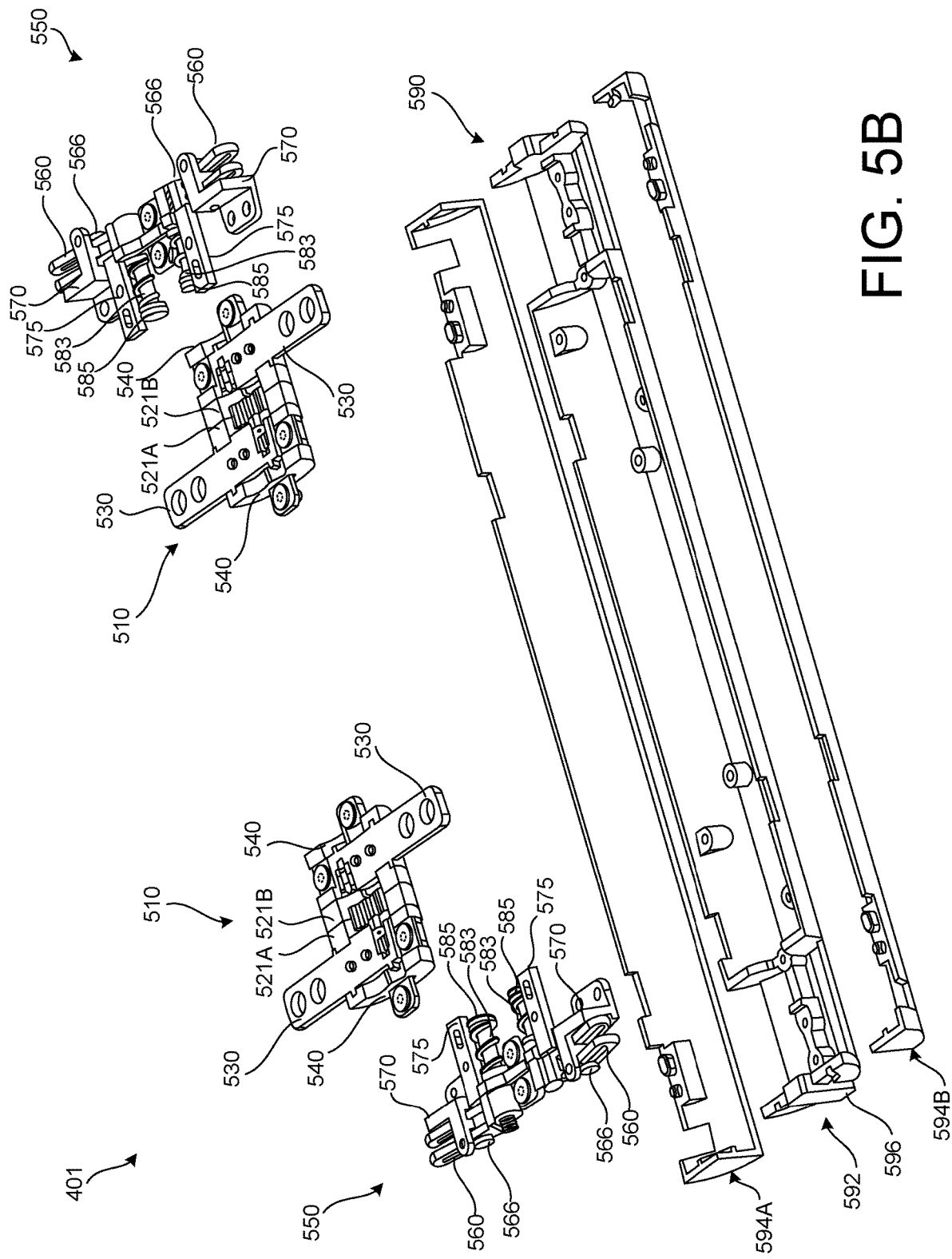
FIG. 5B is an exploded perspective view, of an exemplary hinge mechanism, in accordance with implementations described herein.

FIG. 5A is an assembled perspective view, and FIG. 5B is a partially exploded perspective view, of an exemplary hinge mechanism 401, in accordance with implementations described herein. As shown in FIGS. 5A and 5B, in some implementations, the hinge mechanism 401 may include one or more synchronizing modules 510 and one or more torsion modules 550 coupled to a cover module 590. In the exemplary arrangement shown in FIGS. 5A and 5B, the exemplary hinge mechanism 401 includes a first synchronizing module 510 and a first torsion module 550 at a first end of the cover module 590, corresponding to a first end 416A of the exemplary computing device 400 shown in FIGS. 4A and 4B, and a second synchronizing module 510 and a second torsion module 550 at a second end of the cover module 590, corresponding to a second end 416B of the exemplary computing device 400 shown in FIGS. 4A and 4B, simply for purposes of discussion and illustration. In some implementations, the hinge mechanism 401 may include more, or fewer, synchronizing modules 510, and/or more, or fewer, torsion modules 550, arranged differently along the length of the cover module 590. The cover module 590 may extend longitudinally, for a length that corresponds to a length of the bendable section 416 of the foldable display 402 of the exemplary computing device 400 shown in FIGS. 4A and 4B, with the synchronizing module(s) 510 and the torsion module(s) 550 being received in a space defined between the cover module 590 and the foldable display 402.

Figure 6:
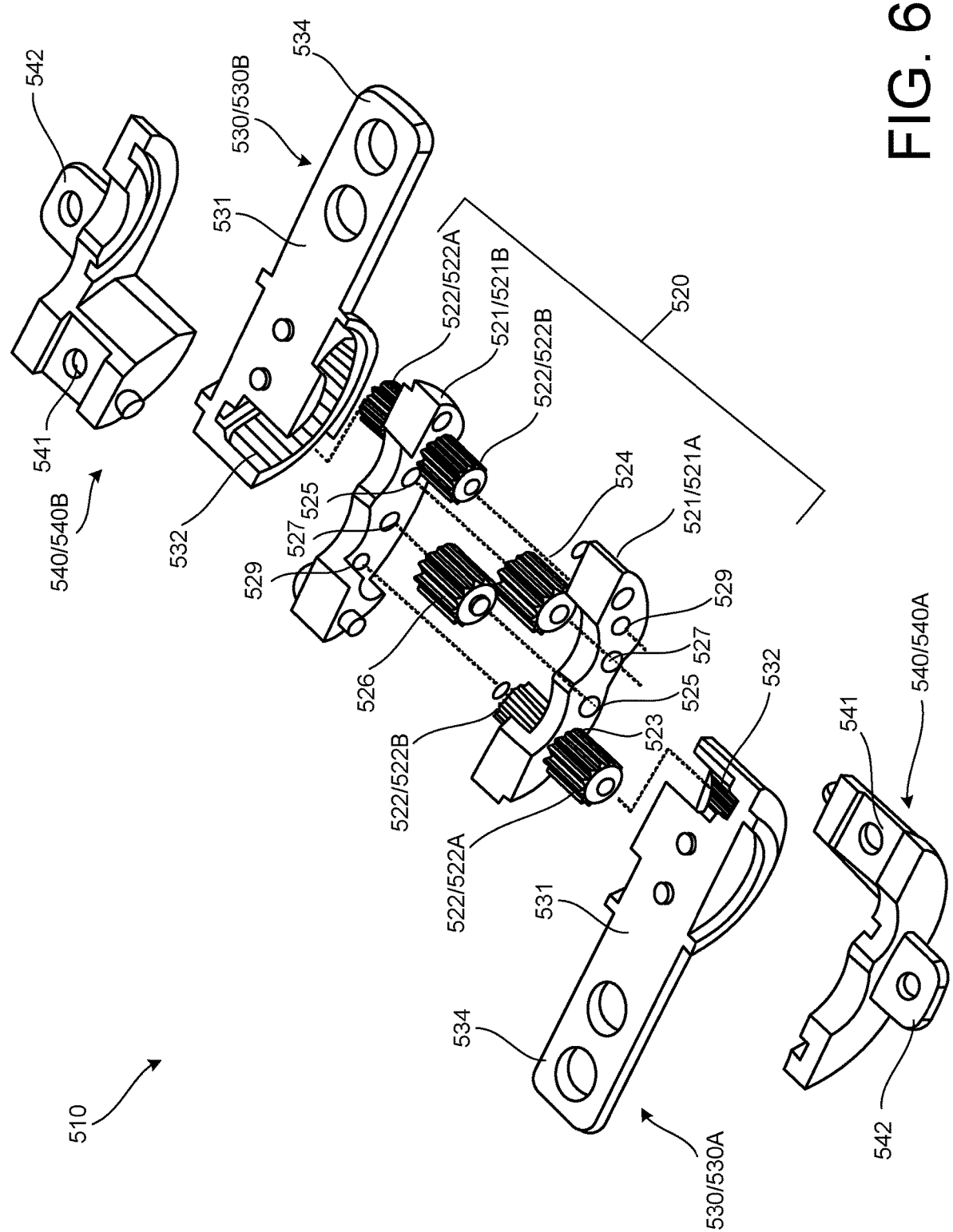
FIG. 6 is an exploded perspective view of a synchronizing module of the exemplary hinge mechanism shown in FIGS. 5A and 5B, in accordance with implementations described herein.
Figure 7:
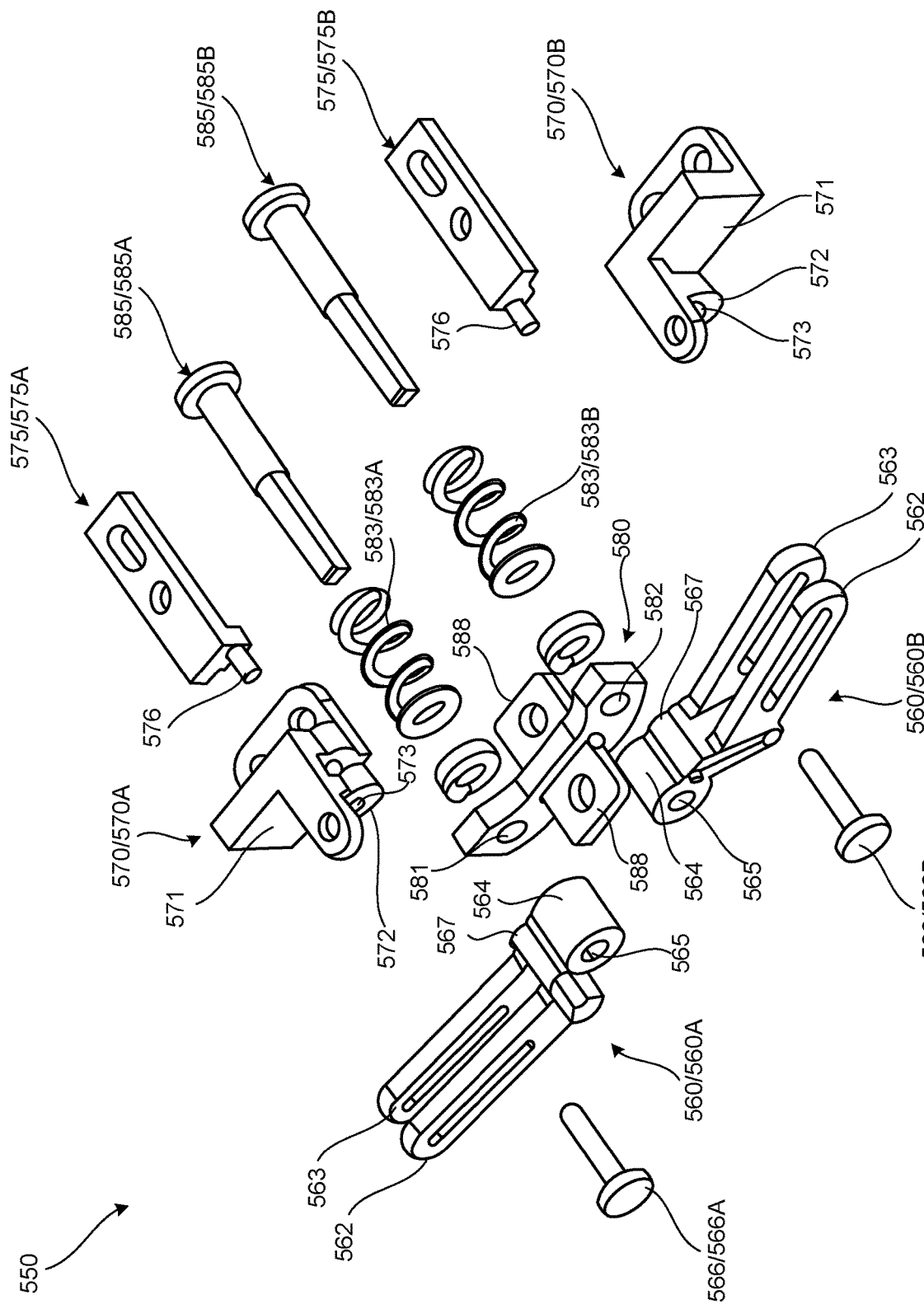
FIG. 7 is an exploded perspective view of a torsion module of the exemplary hinge mechanism shown in FIGS. 5A and 5B, in accordance with implementations described herein.

FIG. 6 is an exploded perspective view of the exemplary synchronizing module 510 of FIGS. 5A and 5B, in accordance with implementations described herein. FIG. 7 is an exploded perspective view of the exemplary torsion module 550 of FIGS. 5A and 5B, in accordance with implementations described herein. The exploded views of FIGS. 6 and 7 include details of elements of the synchronizing module 510 and the torsion module 550, respectively, which may not be illustrated by the less detailed views of FIGS. 5A and 5B.

In some implementations, each of the synchronizing modules 510 (see, for example, FIGS. 5A, 5B and 6) may include a synchronizing gear assembly 520 (shown in FIG. 6) positioned between a pair of rotating links 530 including a first rotating link 530A and a second rotating link 530B. The rotating links 530A, 530B may, in turn, be respectively coupled to a pair of brackets 540 including a first bracket 540A and a second bracket 540B). The first rotating link 530A coupled to the first bracket 540A at a first end portion of the synchronizing gear module 510, and the second rotating link 530B coupled to the second bracket 540B at a second end portion of the synchronizing gear module 510. In some implementations, each of the rotating links 530A, 530B may include a body 531 including an internal gear 532 defined at a first end portion of the body 531 (shown in FIG. 6), and a rotating arm 534 (shown in FIG. 6) defined at a second end portion of the body 531. The rotating arm 534 (shown in FIG. 6) of the first rotating link 530A may be coupled to a housing of a computing device, such as, for example, the first housing 440A of the exemplary computing device 400 shown in FIGS. 4A and 4B. Similarly, the rotating arm 534 of the second rotating link 530B may be coupled to a housing of a computing device, such as, for example, the second housing 440B of the exemplary computing device 400 shown in FIGS. 4A and 4B.

As shown in FIG. 6, the synchronizing gear assembly 520 may include a first gear plate 521A coupled to the first rotating link 530A, and a second gear plate 521B coupled to the second rotating link 530B. A linking gear 522 extends through a first opening 523 in a first end portion of the first gear plate 521A, so that a first portion 522A of the linking gear 522 engages the internal gear 532 of the first rotating link 530A, and a shaft of a second portion 522B of the linking gear 522 is received in an opening 529 in the second gear plate 521B. Similarly, a linking gear 522 extends through a first opening 523 in a first end portion of the second gear plate 521B, so that a first portion 522A of the linking gear 522 engages the internal gear 532 of the second rotating link 530B, and a shaft of a second portion 522B of the linking gear 522 is received in an opening 529 in the first gear plate 521A. A first intermediate gear 524 and a second intermediate gear 526 may be positioned between the first and second gear plates 521A, 521B. Opposite ends of a shaft of the first intermediate gear 524 may be received in an opening 525 in the first gear plate 521A and an opening 527 in the second gear plate 521B. Similarly, opposite ends of a shaft of the second intermediate gear 526 may be received in an opening 527 in the first gear plate 521A and an opening 525 in the second gear plate 521B.

In the arrangement shown in FIG. 6, the linking gear 522 of the first gear plate 521A is in meshed engagement with the internal gear 532 of the first rotating link 530A, and also with the first intermediate gear 524. The first intermediate gear 524 is in meshed engagement with the second portion 522B of the linking gear 522 of the first gear plate 521A, and also with the second intermediate gear 526. The second intermediate gear 526 is in meshed engagement with the first intermediate gear 524, and also with the second portion 522B of the linking gear 522 of the second gear plate 521B. The linking gear 522 of the second gear plate 521B has the second portion 522B engaged with the second intermediate gear 526, and the first portion 522A in meshed engagement with the internal gear 532 of the second gear plate 521B. When arranged in this manner, the engagement of the linking gears 522 of the first and second gear plates 521A, 521B with the intermediate gears 524, 526, and also with the internal gears 532 of the first and second rotating links 530A, 530B, may provide for synchronized, symmetrical movement of the components of the synchronizing module 510, and the remainder of the hinge mechanism 401, about a central plane corresponding to the central longitudinal axis A of the hinge mechanism 401 shown in FIG. 5A.

As shown in FIG. 7, the torsion module 550 may include a central torque bracket 580. A first torque pin 585A may extend through a first torque spring 583A (such that the first torque spring 583A is positioned around the shaft of the first torque pin 585A), through an opening 581 in the central torque bracket 580, and into an opening 565 in a coupling portion 564 of a first torque beam 560A. The first torque spring 583A may thus be positioned between a head the first torque pin 585A and the central torque bracket 580. Similarly, a second torque pin 585B may extend through a second torque spring 583B (such that the second torque spring 583B is positioned around the shaft of the second torque pin 585B), through an opening 582 in the central torque bracket 580, and into an opening 565 in a coupling portion 564 of a second torque beam 560B. The second torque spring 583B may thus be positioned between a head the second torque pin 585B and the central torque bracket 580. The first torque pin 585A and the first torque spring 583A may be referred to as a first biasing device. The second torque pin 585B and the second torque spring 583B may be referred to as a second biasing device.

The first torque beam 560A may include a first slot arm 562 and a second slot arm 563. The first slot arm 562 and the second slot arm 563 may be arranged in parallel to each other. A tab 572 of a first slide bracket 570A may be positioned in a space defined between the first and second slot arms 562, 563. A first slide pin 566A may extend through the first slot arm 562, through an opening 573 in the tab 572 of the first slide bracket 570A (positioned between the first and second slot arms 562, 563), through the second slot arm 563, and into or against a body 571 of the first slide bracket 570A. A pin 576 of a first slide plate 575A is received in an opening 567 formed in the coupling portion 564 of the first torque beam 560A. The first slide bracket 570A (or first sliding bracket), the first slide pin 566A (or first sliding pin), and the first slide plate 575A (or first sliding plate) may together be referred to as a first slide device (or first sliding device).

Similarly, the second torque beam 560B may include a first slot arm 562 and a second slot arm 563. A tab 572 of a second slide bracket 570B may be positioned in a space defined between the first and second slot arms 562, 563 of the second torque beam 560B. A second slide pin 566B may extend through the first slot arm 562, through an opening 573 in the tab 572 of the second slide bracket 570B (positioned between the first and second slot arms 562, 563), through the second slot arm 563, and into or against a body 571 of the second slide bracket 570B. A pin 576 of a second slide plate 575B is received in an opening 567 formed in the coupling portion 564 of the second torque beam 560B. The second slide bracket 570B (or second sliding bracket), the second slide pin 566B (or second sliding pin), and the second slide plate 575B (or second sliding plate) may together be referred to as a second slide device (or second sliding device).

A tab 588 of the central torque bracket 580 of the torsion module 550 may be coupled to a tab 542 of the bracket 540 of the adjacent synchronizing module 510, to couple adjacent synchronizing module(s) 510 and torsion module(s) 550 of the hinge mechanism 401. In some implementations, the torsion module 550 may exert a biasing force on the adjacent synchronizing module 510.

When arranged in this manner, the coupling of the first and second torque pins 585A, 585B with the torque bracket 580 and the first and second torque beams 560A, 560B in this manner, and the slidable coupling of the first and second slide brackets 570A, 570B with the first and second torque beams 560A, 560B by the first and second torque pins 566A, 566B in this manner may provide for synchronized, symmetrical movement of the components of the torsion module 550 about the central plane corresponding to the central longitudinal axis A of the hinge mechanism 401 shown in FIG. 5A. The coordinated, synchronized, symmetrical motion of the coupled synchronizing module(s) 510 and torque module(s) 550 may provide for coordinated, synchronized, symmetrical motion of the hinge mechanism 401, and the foldable display 402/computing device 400 coupled thereto.

As shown in FIG. 5B, the cover module 590 may include a central segment 592, a first lateral segment 594A and a second lateral segment 594B. In some implementations, a protrusion 596 may extend longitudinally along a central portion of an outer surface of the central segment 592 of the cover module 590 (see also, FIGS. 9A-9D). In some implementations, a fastener may extend through the tab 542 of the bracket 540 of the synchronizing module 510, and through the one of the openings 582 of the central torque bracket 580 of the torque module 550, into the central segment 592. In some implementations, fasteners may extend through openings 541 in the brackets 540 of the synchronizing module 510 and into the first and second lateral segments 594A, 594B. In this manner, the synchronizing module 510, the torque module 550, and the cover module 590 may be coupled, and the movement of the synchronizing module 510, the torque module 550, and the cover module 590 may be coordinated.

Figure 8A:
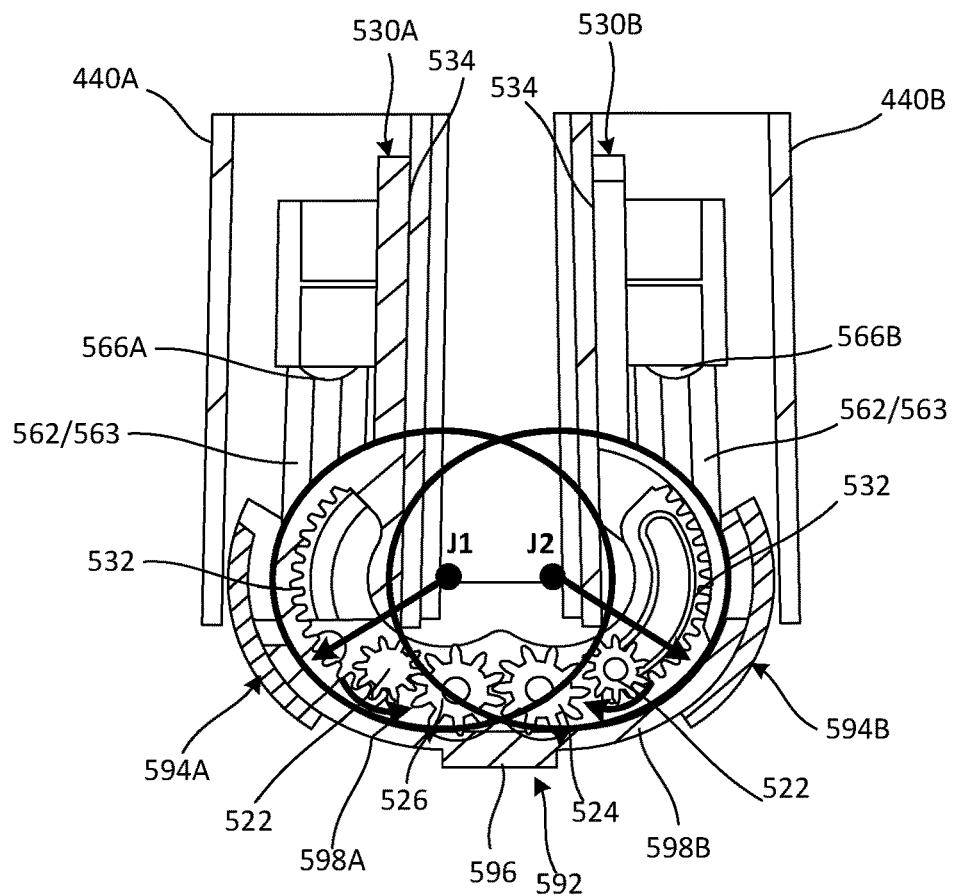
FIG. 8A is a cross-sectional view of the exemplary hinge mechanism, in a folded configuration, taken along line D-D of FIG. 4A.
Figure 8B:
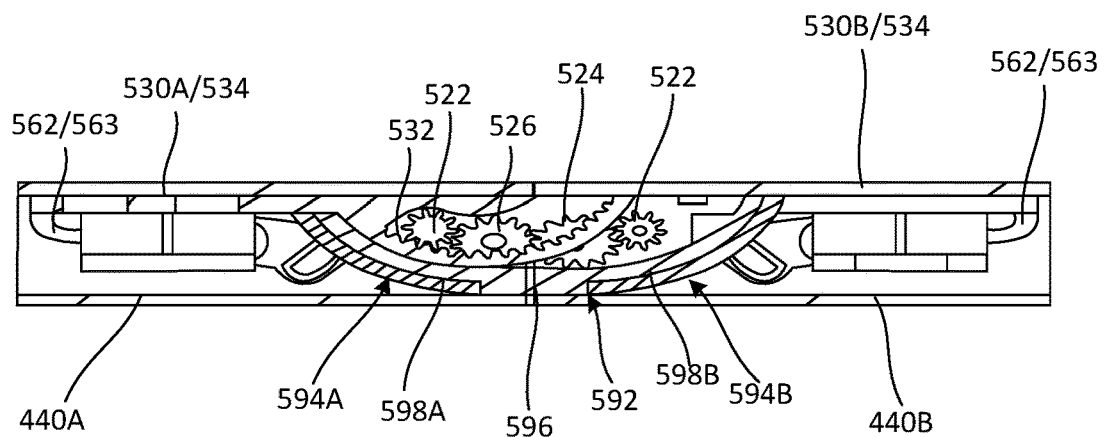
FIG. 8B is a cross-sectional view of the exemplary hinge mechanism, in an unfolded configuration, taken along line E-E of FIG. 4B.

As illustrated in the cross-sectional views shown in FIGS. 8A and 8B, a first virtual axis of rotation J1 may be determined for the first housing 440A of the exemplary computing device 400 shown in FIGS. 4A and 4B, and a second virtual axis of rotation J2 may be determined for the second housing 440B of the exemplary computing device 400 shown in FIGS. 4A and 4B. The first virtual axis J1 and the second virtual axis J2 may be determined, for example, in the manner described above with respect to FIGS. 2A-3B. As described above, in some implementations, the first virtual axis J1 and the second virtual axis J2 may be different from the center of rotation C of the foldable display 402. Movement of the first housing 440A about the first virtual axis J1 and movement of the second housing 440B about the second virtual axis J2 may allow for a change in length facilitated by the hinge mechanism 401 as the computing device 400 moves between the unfolded configuration and the folded configuration. As shown in FIGS. 8A and 8B, operation of the hinge mechanism 401, to move from the folded configuration to the unfolded configuration, may guide rotation of the first and second lateral segments 594A, 594B of the cover module 590 away from the central segment 592, thus elongating the distance between the first and second housings 440A, 440B. Operation of the hinge mechanism 401 to move from the unfolded configuration to the folded configuration may guide rotation of the first and second lateral segments 594A, 594B of the cover module 590 back toward the central segment 592, thus shortening, or protracting, the distance between the first and second housings 440A, 440B. This rotating motion may be stopped as the edges of the first and second lateral segments 594A, 594B abut the protrusion 596 of the central segment 592. In the unfolded configuration, the wall portions 598A, 598B of the central segment 592 may be received in, or nested within, the first and second lateral segments 594A, 594B, so as to absorb the change in length, and to reduce an amount of space occupied by the cover module 590.

Figure 9A:
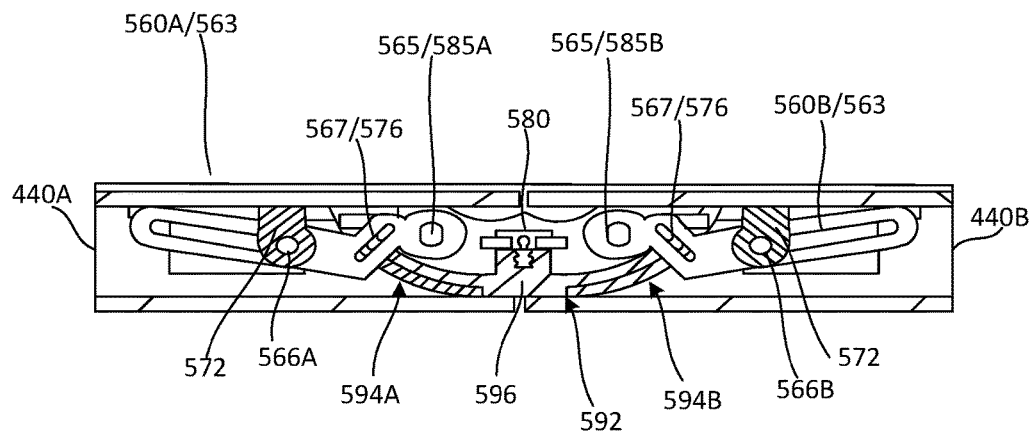
FIGS. 9A-9D are cross-sectional views taken along lines D-D and E-E of FIGS. 4A and 4B, illustrating the movement of components of the exemplary hinge mechanism between a folded configuration and an unfolded configuration.
Figure 9B:
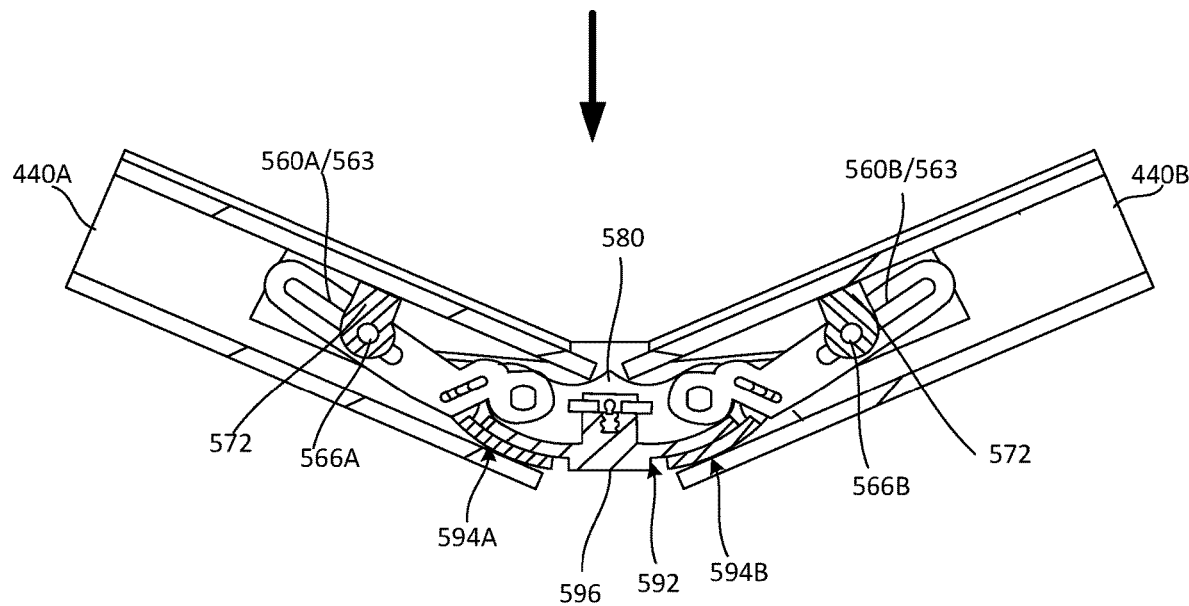
Figure 9D:
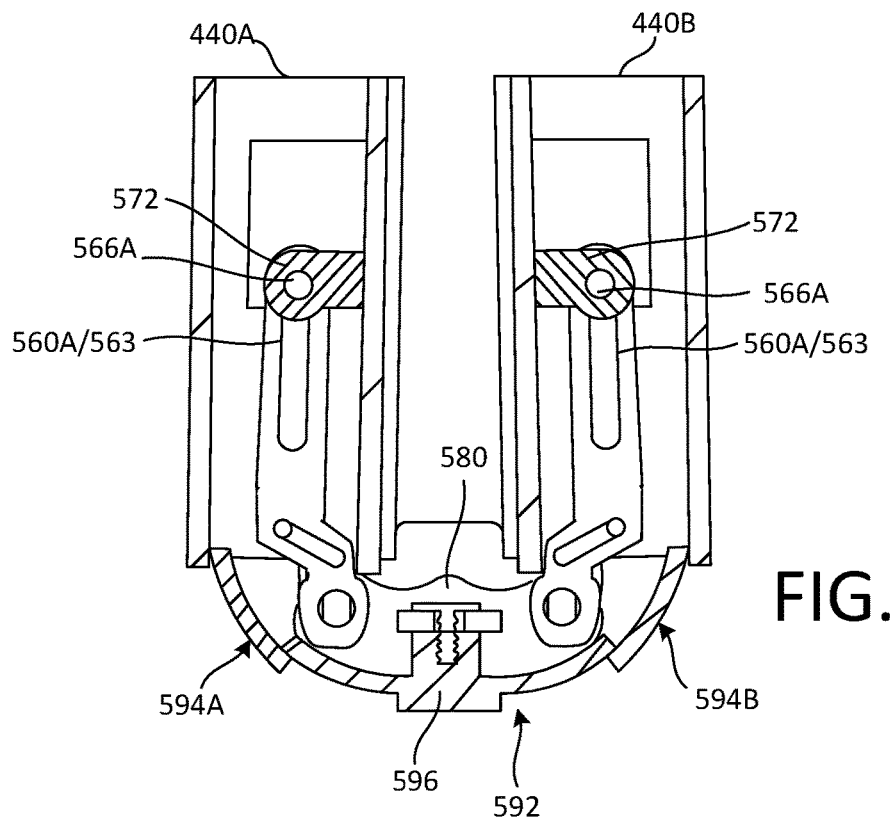
Figure 9C:
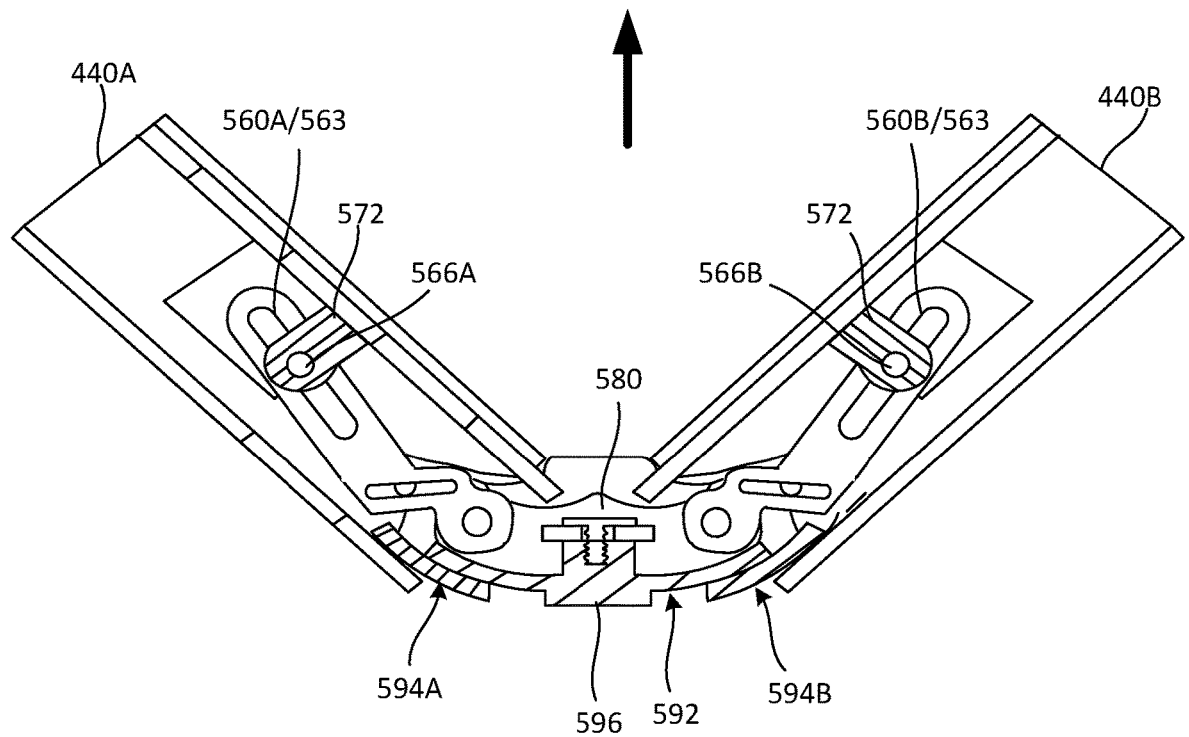

FIGS. 9A-9D are cross-sectional views of the exemplary hinge mechanism 401 installed in the exemplary computing device 400, taken along lines D-D and E-E of FIGS. 4A and 4B, as the computing device 400 is moved from the substantially fully unfolded configuration shown in FIGS. 4A and 9A, through the partially folded configurations shown in FIGS. 9B and 9C, to the substantially fully folded configuration shown in FIGS. 4B and 9D. FIGS. 9A-9D illustrate the sliding motion of the pins 566A, 566B in the slot arms 562, 563 of the torque beams 560A, 560B and the slide brackets 570A, 570B that allows for the elongation of the hinge mechanism 401 as the computing device 400 moves from the unfolded configuration to the folded configuration (and for the protraction of the hinge mechanism 401 as the computing device 400 moves from the folded configuration to the unfolded configuration). The coupling of the rotating arms 534 of the rotating links 530A, 530B to the housings 440A, 440B, and the meshed engagement of the gears 532, 522, 524, 526 as described above in detail with respect to FIG. 6, provide for the synchronized, symmetrical movement of the first and second housings 440A, 440B, and the segments 592, 594A, 594B of the cover module 590, to in turn maintain a desired contour of the foldable display 402 as the computing device 400 is moved in this manner.

In a computing device including a hinge mechanism, in accordance with implementations as described herein, a relatively simple, and relatively reliable hinge mechanism may support the folding and unfolding of a foldable display, with a relatively natural motion, while also providing for planarity of the foldable display in the unfolded configuration, particularly in the bendable section of the foldable display. This relatively simple and reliable hinge mechanism may guide and support the folding and unfolding of the computing device including the foldable display, while still providing support to the foldable display, and while still maintaining the foldable display within allowable bending radius limits.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It is understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It is understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A hinge mechanism, comprising:
    a synchronizing module, including:
        a first rotating link;
        a second rotating link; and
        a synchronizing gear assembly rotatably coupled to the first rotating link and the second rotating link through meshed engagement with the first rotating link and the second rotating link;
    a torsion module coupled to the synchronizing module, wherein the torsion module is configured to selectively exert a biasing force on the synchronizing module, wherein the torsion module includes:
        a torque bracket;
        a first torque beam and a second torque beam coupled to the torque bracket;
        a first biasing device coupled to the torque bracket and to the first torque beam;
        a second biasing device coupled to the torque bracket and to the second torque beam;
        a first sliding device slidably coupled to the first torque beam; and
        a second sliding device slidably coupled to the second torque beam; and
    a cover module coupled to the synchronizing module, wherein the cover module is configured to move in response to movement of the synchronizing module.

2. The hinge mechanism of claim 1, wherein the first and second rotating links each include:
    a body;
    a rotating arm at a first end portion of the body, the rotating arm being configured to be coupled to a corresponding portion of a housing of a computing device; and
    an internal gear at a second end portion of the body, wherein the internal gear is configured to be in meshed engagement with a corresponding linking gear of the synchronizing gear assembly.

3. The hinge mechanism of claim 2, wherein the synchronizing gear assembly includes:
    a first gear plate;
    a first linking gear in meshed engagement with the internal gear of the first rotating link;
    a second gear plate;
    a second linking gear in meshed engagement with the internal gear of the second rotating link;
    a first intermediate gear positioned between the first and second gear plates, and in meshed engagement with the first linking gear; and
    a second intermediate gear positioned between the first and second gear plates, and in meshed engagement with the first intermediate gear and with the second linking gear.

4. The hinge mechanism of claim 3, wherein
    the first linking gear extends through the first gear plate, with a first portion of the first linking gear positioned at a first side of the first gear plate, the first portion of the first linking gear being in meshed engagement with the internal gear of the first rotating link, and a second portion of the first linking gear positioned at a second side of the first gear plate being in meshed engagement with the first intermediate gear, and
    the second linking gear extends through the second gear plate, with a first portion of the second linking gear positioned at a first side of the second gear plate, the first portion of the second linking gear being in meshed engagement with the internal gear of the second rotating link, and a second portion of the second linking gear positioned at a second side of the second gear plate being in meshed engagement with the second intermediate gear.

5. The hinge mechanism of claim 1, wherein the first torque beam and the second torque beam each include:
    a body;
    a coupling portion defined at a first end portion of the body;
    a first slot arm extending outward from the coupling portion; and
    a second slot arm extending outward from the coupling portion, arranged in parallel to the first slot arm, and spaced apart from the first slot arm.

6. The hinge mechanism of claim 5, wherein the first biasing device and the second biasing device each include:

a pin extending through a corresponding opening in the torque bracket and into the coupling portion of the respective torque beam; and a spring positioned on a shaft of the pin, between a head of the pin and the torque bracket.

7. The hinge mechanism of claim 5, wherein the first sliding device and the second sliding device each include:

a sliding bracket having a tab positioned between the first slot arm and the second slot arm of the respective torque beam;

a sliding pin extending through a slot in the first slot arm, through the tab of the sliding bracket, through a slot in the second slot arm, and into a body portion of the sliding bracket, wherein the sliding pin is slidable along a length of the slot in the first slot arm and along a length of the slot in the second slot arm; and a sliding plate having a pin that is received in an opening in the coupling portion of the respective torque beam, wherein the sliding plate is configured to be coupled to a corresponding portion of a housing of a device in which the hinge mechanism is installed.

8. The hinge mechanism of claim 7, wherein:

in a folded configuration of the hinge mechanism, the sliding pin abuts a first end of the slot in the first slot arm and a first end of the slot in the second slot arm, so as to limit further rotation of the hinge mechanism in a first direction, and in an unfolded configuration of the hinge mechanism, the sliding pin abuts a second end of the slot in the first slot arm and a second end of the slot in the second slot arm, so as to limit further rotation of the hinge mechanism in a second direction.

9. The hinge mechanism of claim 1, wherein the cover module includes:

a central segment;

a first lateral segment movably coupled at a first lateral side of the central segment; and a second lateral segment movably coupled at a second lateral side of the central segment, wherein the cover module is configured to movably extend between a first housing and a second housing of a computing device in response to relative movement between the first housing and the second housing.

10. The hinge mechanism of claim 9, wherein the central segment includes a protrusion along a central longitudinal portion thereof, and wherein, in an unfolded configuration of the hinge mechanism, an end portion of the first lateral segment abuts a first side of the protrusion, and an end portion of the second lateral segment abuts a second side of the protrusion, so as to restrict further rotation of the cover module.

11. The hinge mechanism of claim 9, wherein:

the first rotating link is configured to be fixed to the first housing;

the second rotating link is configured to be fixed to the second housing; and a first bracket and a second bracket of the synchronizing module are fixed to the central segment of the cover module.

12. A foldable device, comprising:

a housing;

a foldable display coupled to the housing; and a hinge mechanism received in the housing, at a position corresponding to a bendable section of the foldable display, wherein the hinge mechanism includes:

a synchronizing module, including:

a first rotating link is-coupled to a first portion of the housing;

a second rotating link coupled to a second portion of the housing; and a synchronizing gear assembly rotatably coupled to the first rotating link and the second rotating link through meshed engagement with the first rotating link and the second rotating link;

a torsion module coupled to the synchronizing module and configured to selectively exert a biasing force on the synchronizing module, wherein the torsion module includes:

a torque bracket;

a first torque beam and a second torque beam coupled to the torque bracket;

a first biasing device coupled to the torque bracket and to the first torque beam;

a second biasing device coupled to the torque bracket and to the second torque beam;

a first sliding device slidably coupled to the first torque beam, and fixedly coupled to the first portion of the housing; and a second sliding device slidably coupled to the second torque beam, and fixedly coupled to the second portion of the housing; and a cover module coupled to the first and second portions of the housing, for coordinated movement of the cover module, the synchronizing module, and the first and second portions of the housing.

13. The foldable device of claim 12, wherein the first and second rotating links each include:

a body;

a rotating arm at a first end portion of the body, the rotating arm being coupled to the respective portion of the housing; and an internal gear at a second end portion of the body; and wherein the synchronizing gear assembly includes:

a first gear plate;

a first linking gear in meshed engagement with the internal gear of the first rotating link;

a second gear plate;

a second linking gear in meshed engagement with the internal gear of the second rotating link;

a first intermediate gear positioned between the first and second gear plates, and in meshed engagement with the first linking gear; and a second intermediate gear positioned between the first and second gear plates, and in meshed engagement with the first intermediate gear and with the second linking gear.

14. The foldable device of claim 12, wherein the first torque beam and the second torque beam each include:

a body;

a coupling portion defined at a first end portion of the body;

a first slot arm extending outward from the coupling portion; and a second slot arm extending outward from the coupling portion, arranged in parallel to the first slot arm, and spaced apart from the first slot arm.

15. The foldable device of claim 14, wherein the first sliding device and the second sliding device each include:

a sliding bracket having a tab positioned between the first slot arm and the second slot arm of the respective torque beam;

a sliding pin extending through a slot in the first slot arm, through the tab of the sliding bracket, through a slot in the second slot arm, and into a body portion of the sliding bracket, wherein the sliding pin is slidable along a length of the slot in the first slot arm and along a length of the slot in the second slot arm; and a sliding plate having a pin that is received in an opening in the coupling portion of the respective torque beam, wherein the sliding plate is configured to be coupled to a corresponding portion of a housing of a device in which the hinge mechanism is installed.

16. The foldable device of claim 12, wherein the cover module includes:
   a central segment including a protrusion along a central longitudinal portion thereof;
   a first lateral segment movably coupled at a first lateral side of the central segment, and fixedly coupled to the first portion of the housing; and
   a second lateral segment movably coupled at a second lateral side of the central segment, and fixedly coupled to the second portion of the housing, wherein, in an unfolded configuration of the foldable device, an end portion of the first lateral segment abuts a first side of the protrusion, and an end portion of the second lateral segment abuts a second side of the protrusion, so as to restrict further rotation of the cover module.

17. A hinge mechanism, comprising:
   a synchronizing module, including:
      a first rotating link including an internal gear;
      a first gear plate;
      a first linking gear in meshed engagement with the internal gear of the first rotating link;
      a second rotating link;
      a second gear plate including an internal gear;
      a second linking gear in meshed engagement with the internal gear of the second rotating link;
      a first intermediate gear positioned between the first and second gear plates, and in meshed engagement with the first linking gear; and
      a second intermediate gear positioned between the first and second gear plates, and in meshed engagement with the first intermediate gear and with the second linking gear; and
      a synchronizing gear assembly rotatably coupled to the first rotating link and the second rotating link through meshed engagement with the first rotating link and the second rotating link;
   a torsion module coupled to the synchronizing module, wherein the torsion module is configured to selectively exert a biasing force on the synchronizing module; and
   a cover module coupled to the synchronizing module, wherein the cover module is configured to move in response to movement of the synchronizing module.

18. The hinge mechanism of claim 17, wherein the first and second rotating links each include:
   a body;
   a rotating arm at a first end portion of the body, the rotating arm being configured to be coupled to a corresponding portion of a housing of a computing device; and
   the respective internal gear at a second end portion of the body, wherein the internal gear is configured to be in meshed engagement with a corresponding linking gear of the synchronizing gear assembly.

* * * * *